(12) United States Patent
Rasmussen

(10) Patent No.: US 8,784,716 B2
(45) Date of Patent: Jul. 22, 2014

(54) METHOD AND APPARATUS FOR LONGITUDINAL ORIENTATION OF THERMOPLASTIC FILM MATERIAL

(76) Inventor: Ole-Bendt Rasmussen, Walchwil (CH)

(*) Notice: Subject to any disclaimer, the term of this patent is extended or adjusted under 35 U.S.C. 154(b) by 1055 days.

(21) Appl. No.: 12/740,203

(22) PCT Filed: Oct. 30, 2008

(86) PCT No.: PCT/EP2008/064735
§ 371 (c)(1),
(2), (4) Date: Dec. 1, 2010

(87) PCT Pub. No.: WO2009/056601
PCT Pub. Date: May 7, 2009

(65) Prior Publication Data
US 2011/0095448 A1    Apr. 28, 2011

(30) Foreign Application Priority Data
Oct. 31, 2007   (GB) .................................. 0721410.9

(51) Int. Cl.
*B31F 1/22*         (2006.01)
(52) U.S. Cl.
USPC .................... 264/288.4; 264/286; 264/167
(58) Field of Classification Search
USPC ....................................... 264/288.4, 286, 167
See application file for complete search history.

(56) References Cited

U.S. PATENT DOCUMENTS

| | | | |
|---|---|---|---|
| 3,233,029 A * | 2/1966 | Rasmussen ................ | 264/287 |
| 3,478,142 A | 11/1969 | Greene | |
| 3,491,185 A | 1/1970 | Rasmussen | |
| 4,793,885 A * | 12/1988 | Rasmussen ................ | 156/200 |
| 5,185,052 A * | 2/1993 | Chappell et al. ............ | 156/462 |

FOREIGN PATENT DOCUMENTS

WO   PCT/EP2008/064735     10/2008

* cited by examiner

*Primary Examiner* — Galen Hauth
(74) *Attorney, Agent, or Firm* — Robert W Strozier

(57) ABSTRACT

Method and apparatus for longitudinal orientation of thermoplastic film material (4) comprises a width-reduction zone upstream of the longitudinal stretching zone, through which the width of the film is gradually reduced so as to allow longitudinal stretching without necking. The width-reduction zone comprises at least one, preferably several, pairs of pleating rollers (16, 17) comprising intermeshing grooves or discs for pleating the material, the length of said width reduction zone preferably being less than 3 times the original width of the film. The width-reducing zone has upstream (14) and downstream (15) rollers or roller assemblies, with curved axes and optionally also conveyor belts for providing smooth width reduction. Longitudinal stretching is preferably between at least two, and preferably more than two, pairs of stretching rollers (9, 10, 11, 12) which are relatively close together. The pleats may be provided in several stages with increasing pleats per stage, while guiding means preferably lay all the pleats to one side. The method allows achievement of high tensile strength, yield point, resistance to tear propagation and puncture resistance, especially for polyethylene and polypropylene films.

27 Claims, 11 Drawing Sheets

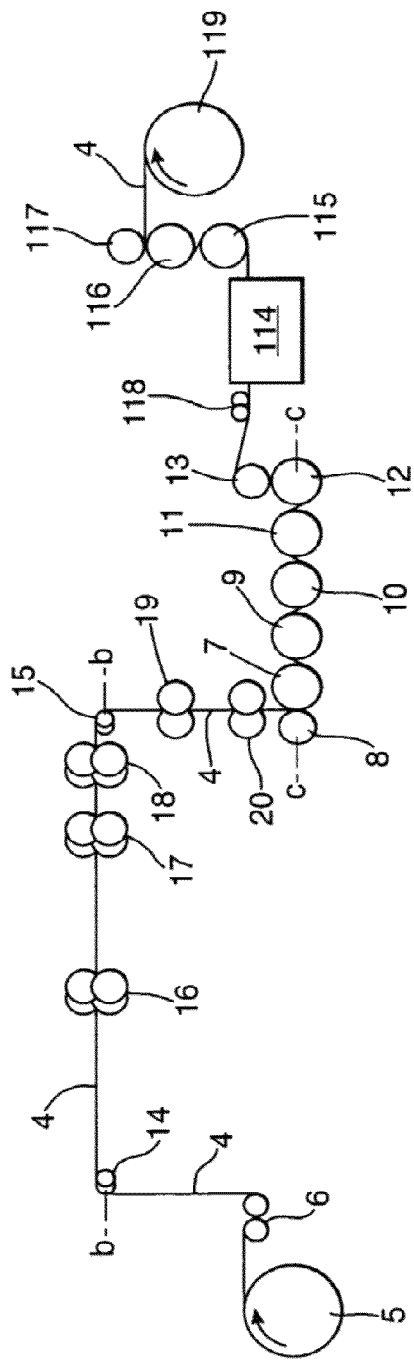

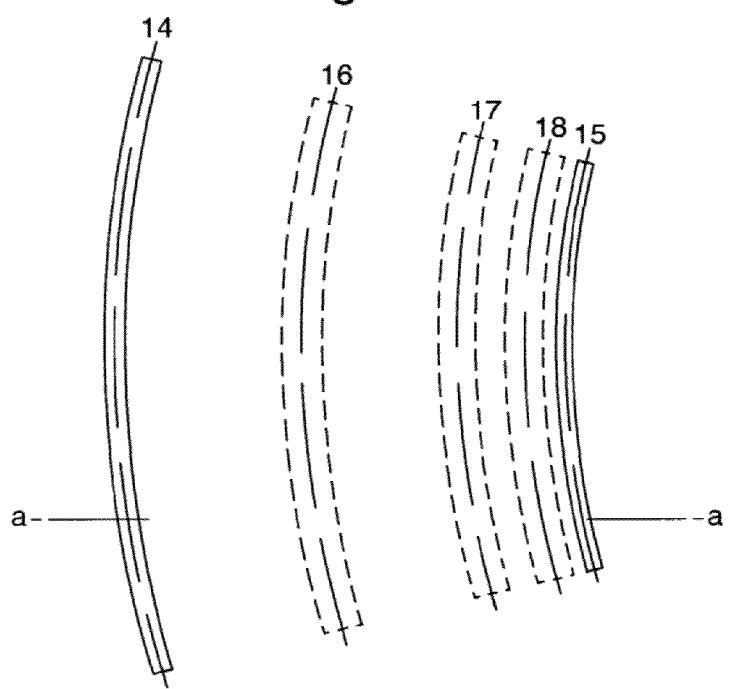

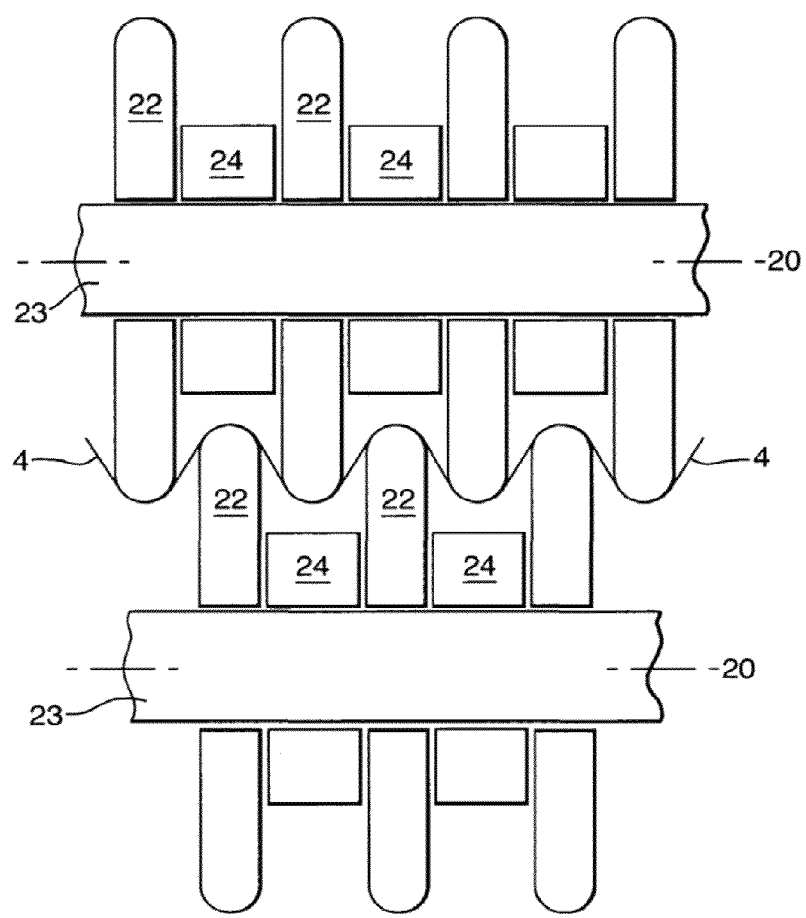

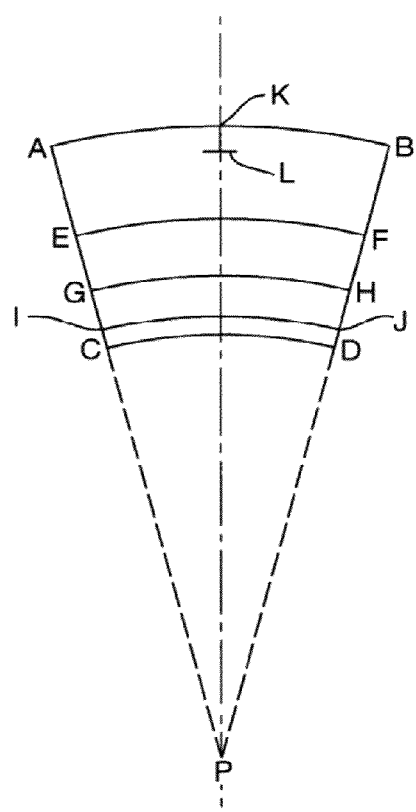

METHOD AND APPARATUS FOR LONGITUDINAL ORIENTATION OF THERMOPLASTIC FILM MATERIAL

RELATED APPLICATIONS

This application is a 35 U.S.C. §371 Nationalization of PCT/EP2008/064735 filed 30 Oct. 2008 (Oct. 30, 2008), published as WO2009056601 published on 7 May 2009 (May 7, 2009), which claims priority to GB0721410.9, filed 31 Oct. 2007 (Oct. 31, 2007).

BACKGROUND OF THE INVENTION

1. Field of the Invention

The invention concerns method and apparatus for longitudinal orientation of thermoplastic film material, especially with a view to the manufacture of crosslaminates of films which have been uniaxially stretched at a relatively low temperature. It is known that the best all-round strength properties in a crosslaminate are obtained by the following steps of orientation: first a strong almost uniaxial melt-orientation during the drawdown from the extrusion die, or still better an almost uniaxial orientation while the polymer material is semimolten, and then further orientation at a rather low temperature. "All-round strength properties" here refers to a combination of tensile strength, yield point, tear propagation resistance and puncture resistance. It is difficult to give a satisfactory explanation why this combination of orientation steps is preferable, but it can briefly be said that when the orientation is carried out in these steps, the molecular chains will exhibit a wide spectrum of different degrees of orientation, and those of relatively low orientation will help the film to re-orient instead of splitting, when it is subjected to tearing or puncturing forces.

However, the stretching at low temperature causes significant problems, e.g. in films which may consist of high density polyethylene (HDPE) or isotactic or syndiotactic polypropylene (PP). One side of this problem is that, when a film is longitudinally stretched, it has a high tendency to contract in the transverse direction, at the same time as its thickness is reduced. This tendency is highest when the temperature is low, e.g. between 10-40° C. which is optimum stretching temperature range for HDPE and PP, as far as the achieved properties are concerned. The other side of the problem is that, at these low temperatures the material tends to "neck in", instead of gradually developing the orientation within a reasonably long zone. This means that the stretching must take place between closely spaced stretching rollers or stretching bars, and unless special precautions are taken this will prevent the film from undergoing the needed contraction in the transverse direction.

2. Description of the Related Art

In the inventor's U.S. Pat. No. 3,233,029, which was published about 40 years ago, a proposal is made for solution of this problem, namely, to "anticipate" a substantial part of the transverse contraction to which the film tends by longitudinal pleating prior to a stretching within one or more short stretching zones, as this is more exactly expressed as follows: the stretching taking place in one or more short zones between and/or on two or more stretching rollers or bars, in which process the width measured in a straight line from edge to edge is reduced prior to the stretching, this reduction being in form of a regular pattern of longitudinally extending pleats, whereby the reduction of width and the length of the stretching zones are adapted to allow the film a full straightening out of the pleats by the inherent tendency in the polymer material to contract transversely while being stretched longitudinally.

In that patent, the pleating mechanism described consists of two sets of discs which are mounted spaced apart upon the shafts, one over and one under the film to become pleated, so that discs in one set mesh between the discs in the other set. Thereby the film is forced to form folds or convolutions. It is further disclosed that the film preferably shall pass over a crown-shaped roller adapted to make the stress upon the borders equal to that in the middle of the film. Crown-shaping means that the roller has highest diameter in its middle, the diameter gradually decreasing towards its ends. Finally it is disclosed that the film preferably is cooled in the stretching zone, which may conveniently be by covering a stretching bar with felt and keeping this felt wet. The water also, by its lubricating action, helps to allow the film the transverse contraction which eliminates the pleats. No pleats remain in the final product.

The inventor managed to make this old invention work with flexibilized HDPE and PP, but only in relatively narrow widths, insufficient for an industrial production e.g. of crosslaminated industrial bags or cross-laminated coversheet. When trying to apply the invention to stiffer film, such as film made from plain HDPE or PP, or when trying it on film of greater width, e.g. 1 m wide, the transverse forces applied by the film always caused a transverse stretching of the film in the form of thin, longitudinally extending lines. It appears that the principle to apply longitudinal pleating thereby allowing a film transverse contraction during longitudinal stretching, has up to now only been carried out industrially under conditions which also produce transverse stretching and attenuation along narrow longitudinal lines.

SUMMARY OF THE INVENTION

The present invention provides an improved process of supplying a thermoplastic polymer film with a longitudinal orientation by stretching in solid state. The stretching taking place in one or more short zones between and/or on two or more stretching rollers or bars, in which process the width measured in a straight line from edge to edge is reduced prior to the stretching. This reduction being in form of a regular pattern of longitudinally extending pleats, whereby the reduction of width and the length of the stretching zones are adapted to allow the film a full straightening out of the pleats by the inherent tendency in the polymer material to contract transversely while being stretched longitudinally, and whereby the formation of said pleats takes place between at least one pair of mutually intermeshing grooved rollers or intermeshing sets of discs. The improvement being characterized in that the reduction of width takes place gradually within a reduction zone no shorter than half of the original film width, this zone being limited by an upstream roller or roller assembly and a downstream roller or roller assembly installed with varying directions of the axis of rotation, this direction forming an angle of 90° with the machine direction at the middle of the film and gradually changing towards its edges to forward the film in converging manner within the reduction zone.

The present invention provides an apparatus for longitudinal orientation of a thermoplastic film (4) comprising, in sequence in the machine direction, i) a width-reducing station comprising at least one pair of intermeshing pleating rollers (16) comprising intermeshing grooved rollers or intermeshing sets of discs for application of regular longitudinally extending pleats across the width of the film; and ii) a longitudinal stretching station for stretching the film longitudinally in the solid state, comprising one or more spaced pairs of stretching rollers (9, 10) or bars, the spacing between each said pair being relatively short, characterized in that the width-reducing station comprises an upstream roller (14) or roller assembly and a downstream roller (15) or roller assembly with a width reduction zone located therebetween, the upstream and downstream roller or roller assembly having varying directions for the respective axis of rotation, the variation being from 90° with the machine direction at the center of the film, gradually varying on both sides of the center towards the edges of the film, so that the film is directed through the width reducing station while the edges of the film converge towards the center.

BRIEF DESCRIPTION OF THE DRAWINGS

The invention shall now be described in further detail with reference to the figures.

FIGS. 2a and 2b are principal sketches showing a line for m.d. stretching, including the devices for pleating the film prior to the stretching. FIG. 2a, which represents the entire line, is a vertical section comprising the section along a-a in FIG. 2b is the horizontal section along b-b in FIG. 2a. For the sake of clear illustration the distance between the different rollers are generally shown disproportionately short in comparison with the diameters of the rollers. Also the grooved surface patterns of the pleating rollers are not shown.

FIG. 3 shows a diagrammatic section through the axes a segment of a pair of intermeshing grooved rollers forming, adjusting or controlling the pleating. In case the grooved rollers are banana rollers, it should be understood as a folded-out view.

FIG. 10 shows a part of a crown-shaped roller composed of many segments which can be rotated independent of each other. This construction is a substitute of the first banana roller shown in FIGS. 2a and b.

DETAILED DESCRIPTION OF THE INVENTION

Figure 1:
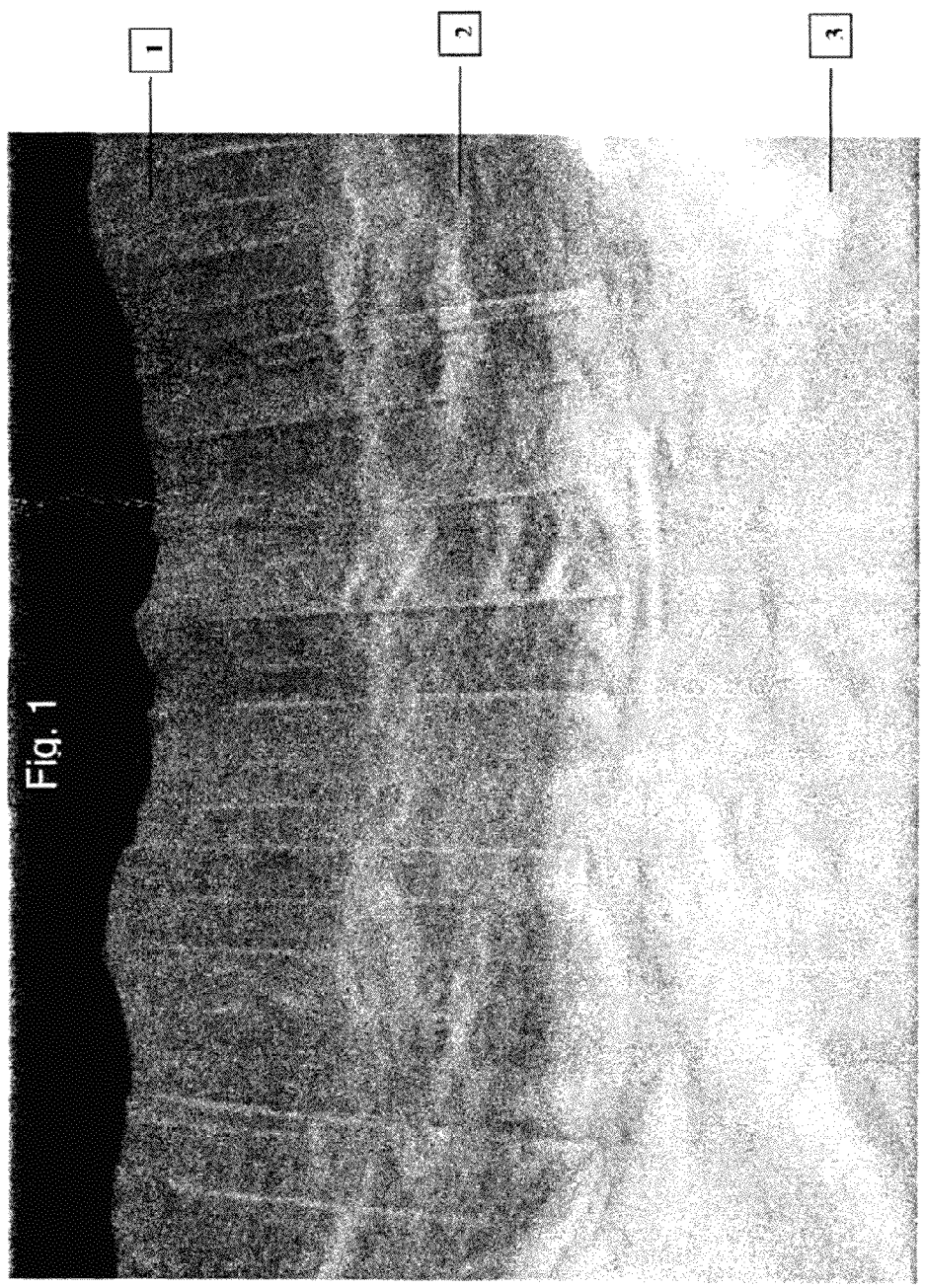
FIG. 1 is a photograph illustrating, in perspective view the basic principle that the tendency to transverse contraction of a film during longitudinal orientation is allowed to take place by feeding the film into the stretching zone in pleated state. The photo shows a sample of a lay-flat tubular film, mainly consisting of HDPE, before and after the stretching described in Example 1. The sample was taken of out the cold-stretching machine during a stop.

The described problem is overcome by the improvement: characterized in that the reduction of width takes place gradually within a reduction zone no shorter than half of the original film width, this zone being limited by an upstream roller or roller assembly and a downstream roller or roller assembly installed with varying directions of the axis of rotation, this direction forming an angle of 90° with the machine direction at the middle of the film and gradually changing towards its edges to forward the film in converging manner within the reduction zone. By forwarding the film in the mentioned converging manner, the transversely acting forces exerted by the pleating devices are reduced and can be almost entirely eliminated by optimized adjustments, so that the formation of transversely stretched, attenuated longitudinal lines is avoided. The preferable degree of pleating, i.e. the ratio between the film width before pleating and after pleating, the latter measured along a straight line from edge to edge, will be discussed in the specific description.

The invention has particular importance in connection with longitudinal stretching of the film which mainly consists of HDPE, PP or blends of these polymers, since the relatively low price and their stiffness and achievable strength properties make them most suitable for crosslaminates used in industrial articles such as e.g. industrial bags, cover sheets, tarpaulins, reinforced bitumen sheets, pond liners, green-house film and "house-wrap-film". However, the invention is also applicable to all other film of thermoplastic polymer material, if such film in the form of narrow strips can be oriented at or near normal room temperature. As examples the invention is applicable to film based on polyamides, polyesters such as polyethyleneterephthalate, polyvinylidenechloride and crystalline copolymers of vinylchloride and vinylindenechloride. It is also expected to become useful for films based on cold-stretchable biodegradable polymer materials.

Most conveniently, the reduction zone should be no longer than 3 times the original film width, preferably no more than twice and still more preferably no more than equal to the width.

The advantages of stretching at relatively low temperatures have been mentioned above, and the stretching according to the invention should normally take place at a temperature no higher than 60° C., preferably no higher than 50° C., and still more preferably no more than 40° C. The film to be stretched may be in the form of a lay-flat tube. This has in particular reference to the manufacture of crosslaminates from uniaxially oriented films, since the normal manufacturing process for such crosslaminates comprises a step of helical cutting of a longitudinally oriented tube.

In a preferred embodiment of the invention the downstream roller or roller assembly comprises at least one banana roller with its convex side pointing towards the upstream roller assembly. "Banana roller" is the name normally used for a roller having a curved axis, usually formed as an arc of a circle. Banana rollers are normally used to remove wrinkles or pleats, but here used to the contrary. In its simplest form a banana roller consists of a slightly bent shaft put into a rubber pipe, which can rotate on this shaft. The pipe is normally lubricated e.g. with talc. In a more industrial design, there is an array of ball bearings or roller bearings, closely side by side between the bent shaft and the rubber pipe. The rubber pipe can e.g. be substituted by an array of rings, each one fitted to a bearing.

The bending of the banana roller may be adjustable. Adjustment of a conventional banana roller is well known and can take place by adjustment of the angular position of the ends of the shaft. To allow a variable bending, the shaft is preferably made from a composite, e.g. of glass fibres or carbon fibres embedded in polymer material.

No matter whether a banana roller with adjustable or fixed bending is used, the radius of the bending is determined by the length of the contraction zone and the chosen degree of pleating. This is explained in the specific description.

As a technical equivalent to the use of at least one banana roller as downstream roller, or as part of the downstream roller assembly, there my be provided many short rollers mounted individually in such a way that together they form part of a polygon approaching an arc of a circle.

While the film leaves the last roller or roller assembly of the downstream part of the reduction zone and proceeds towards the stretching rollers or bars, it is preferably guided in a direction substantially perpendicular to its movement with the reduction zone, preferably deviating no more than 10° from being perpendicular to this direction. As it shall be further explained in connection with the description of the drawings, this precaution serves to equalize the longitudinal tensions in the film over its width.

Similar to the construction of the downstream roller or roller assembly, the upstream roller or roller assembly may conveniently consist of a banana roller or several parallel banana rollers with the concave side or sides pointing towards the downstream roller or roller assembly. Said banana roller or rollers preferably form arcs, the tangents of which at any location are perpendicular to the film tension created by the downstream roller or roller assembly. This means, if upstream and downstream rollers are banana rollers, that these rollers form generally concentric arcs. This is further clarified in the specific description of the preferred embodiment.

The upstream banana roller or the last one of the upstream banana rollers can with advantage be supplied with an array of protruding circular segment parts to start the pleating. Also similar to the construction downstream of the reduction zone, the bending of each banana roller can be made adjustable.

As already mentioned, the film preferably exits from the downstream part of the reduction zone substantially perpendicular to its movement within this zone. It also preferably and for similar reasons is forwarded towards the first upstream roller in a direction substantially perpendicular to its movement within the reduction zone, preferably deviating at the highest 10° from this direction.

As an alternative to the use of one or more banana rollers at the inlet to the reduction zone the upstream roller or roller assembly can be a crown-shaped roller or roller assembly of short rollers which together form a crown-shape on a straight shaft, said short rollers being connected with a common shaft through bearings to be rotatable independently of each other.

The gradual reduction of width within the reduction zone is preferably assisted by grooved banana rollers installed between the upstream roller or roller assembly and the downstream roller or roller assembly, or in other manner by arrays or mutually intermeshing discs. A grooved banana roller for this purpose may consist of discs of different external diameters in alternating succession or of short roller segments supplied with grooves, whereby the discs or roller segments are mounted on a bent shaft through bearings, or they may in themselves act as bearings.

Preferably the intermeshing between two such grooved banana rollers is not set in a fixed manner, but is made variable by means of an adjustable force trying to push the two grooved banana rollers together. This adjustable force may be created by springs, pneumatic means or by gravity. When the pleating is irregular, as generally at the start-up, the forces which try to increase the intermeshing will act most strongly on the film where the degree of pleating is lowest. Provided the means to push the two grooved banana rollers together has been properly adjusted by experimentation, the pleating gradually will become even all over the width of the film.

If the intermeshing between the grooved banana rollers is set in a fixed manner without special precautions being taken, or if the adjustable force trying to push the rollers together is set too high, the result may be that, instead of gradually making the pleating even, the grooved banana rollers perform transverse stretching of the film where the degree of pleating is lowest, hereby creating longitudinally extending thin lines.

It has been found that the system of pleating in an evenly pleated film under zero or low tension tend to become randomized when the film passes over a smooth banana roller or a smooth or straight roller. This can be a problem in connection with the smooth rollers used in the present invention before the film has become permanently elongated. To counteract this randomization there may be guiding means acting immediately upstream of and in close proximity to such smooth roller. These means may preferably be tracks adapted to fold all pleats over to the same side.

The pleating as described is preferably carried out in several steps with several sets of intermeshing grooved banana rollers or arrays of discs, the pitch of the arrays in said sets developing from a coarser to a finer pleating.

Alternatively to the described use of grooved banana rollers, the gradual reduction of width within the reduction zone may be assisted by a set of narrow conveyor belts following and guiding the film through at least a part of this zone, such that the two sets of narrow belts gradually intermesh more and more with each other during the converging advancement in the zone.

The invention also concerns any apparatus suitable for carrying out the method described above, and it is emphasized that banana rollers with grooves suitable for forming or controlling pleating in themselves is considered an invention.

In the photograph FIG. 1, the zone indicated as (1) is the pleated HDPE film before any orientation has been carried out. The zone (2) has been through a first step of stretching at 15° C., namely in the ratio 1.5:1, by which it has become m.d.-oriented within "stretching lines" extending on the bias and crisscrossing each other. The majority of the film is still not oriented, apart from its melt orientation. The orientation produced by the cold stretching can directly be observed, since stretching of film from HDPE or PP at temperatures lower than about 40-50° C. creates closed micro-voids, which act like grains of white pigment. This is well known.

The zone (3) has been through a 3rd step of stretching, in example (1) the final step, and has turned white all over, while the biased, criss-crossing stretching lines gradually have grown and developed into a structure which on macro scale is homogeneous. At the same time the film has contracted in the transverse direction, and the pleats have disappeared. The final stretch ratio before relaxation was 3.8:1 and after relaxation 2.8:1.

The described development of the orientation process, starting with biased, mutually criss-crossing "stretching lines" and continuing as a gradual developing and growing together of these "lines" means that the final oriented film become inhomogeneous seen on a micro scale. There will be micro-regions all over the film having zero or almost zero orientation (apart from the melt orientation), and there will be micro-regions all over the film in which the orientation forms a small angle to the orientation in adjacent micro-regions. This sort of micro-inhomogeneities will help the film to re-orient when subjected to transverse forces, and is therefore very advantageous for the tear propagation resistance and puncture resistance in a crosslaminate made from such stretched films.

As it appears from example 1, the pitch of each of the final grooved rollers for pleating has been 15 mm, and the average "wavelength" of the pleats corresponds hereto. The required fineness of the pleating depends on the transverse contraction forces during the cold stretching and the friction between the film and the withholding stretching roller or rollers. Low transverse contraction forces and/or high friction require a particularly fine pleating.

In FIGS. 2a and b, the film (4) is taken from reel (5) and passed through nip rollers (6) which by means of automatic tension measurement and a brake system (not shown) serve to keep the tension at an adjusted value.

The film proceeds from roller pair (6) through a section, which is discussed in connection with FIG. 4b, to a first smooth banana roller (14) acting as inlet to the width-reducing zone. The exit from this zone is the smooth banana roller (15), and between the smooth banana rollers are installed three pairs of mutually intermeshing grooved banana rollers (16, 17 and 18). The plane determined by the circular axis of the smooth banana roller (14) is essentially identical with the plane determined by the circular axis of the smooth banana roller (15), although small deviations are permissible, and similarly the planes determined by the circular axes of each of the grooved rollers in the width reduction zone, are close to following the same plane. All of the circular axes of the banana rollers are essentially concentric. The choice of radii for these circular arcs is discussed in connection with FIG. 4a.

As discussed in the general description, each of the three pairs of grooved banana rollers are constantly pressed together under an adjusted pressure, but this is not shown in the drawing.

While passing over the smooth banana roller (15), the film changes direction and exits from this roller under an angle close to perpendicular to the direction it followed through the width reduction zone. On its way to the first roller in the stretching part of the machine, i.e., roller (7), it passes two pairs of mutually intermeshing, straight grooved rollers (19 and 20). These two pairs of grooved rollers are also constantly pressed together under an adjusted pressure (means not shown).

Banana rollers (14) and (15) and all grooved rollers, curved or straight, are idle rollers.

Immediately upstream of each of the smooth rollers (15) and (7) and in close proximity to each of these rollers, there are guiding means to avoid the smooth rollers randomizing the even pleating. For the sake of clarity these guiding means are not shown here, but reference is made to FIG. 7 and the connected description.

The pleating of the film is primarily caused by the concentric arrangement of banana rollers (14) and (15) in combination with the tension in the film. However, these means alone will normally produce a coarse and uneven pleating.

In the described arrangement, the groove division on roller pair (16) is relatively big, since it requires a relatively low force to form coarse, even pleats or convolutions, and since fine pleats formed at this position might tend to turn into coarse pleats while proceeding to roller pair (17).

The pitch on roller pair (17) is adapted to double the number of pleats formed by the roller pair (16), and the pitch on roller pair (18) makes a further doubling. The smooth banana roller (15) lays the pleats or convolutions flat as described in connection with FIG. 7. There can be guiding means to secure that this happens in an even manner. To avoid the pleats growing coarser on the way from roller to roller, the distances from roller pair (17) to roller pair (18) and from roller pair (18) to roller pair (15) are relatively short.

On the way to the intermeshing straight grooved rollers (19) the pleats again take the stand-up form. The pitch on roller (19) is adapted to bring the number of pleats back to the number formed by roller pair (17). This is so chosen since in spite of the described guiding tracks the smooth banana roller (15) can cause some disorder in the arrangement of the lay-flat pleats, and reestablishment of the order then requires a bigger pitch. The number of pleats or convolutions is again doubled by the passage through roller pair (20), and then maintained by the smooth, driven roller (7) and the rubber coated nip roller (8).

The distance between rollers (15) and (19) is relatively long. The reason for this choice is discussed in connection with FIG. 4b. The distance between roller pair (20) and rollers (7) and (8) is short to avoid the fine pleats from growing coarser. (The drawing is not quite to scale on these points.)

The smooth, driven roller (7) and its rubber coated counter roller (8) hold back on the film during the stretching, assisted by the smooth roller (9), which is driven at essentially the same circumferential velocity as roller (7).

The smooth rollers (10), (11), and (12) are also driven. Roller (13) is a rubber coated nip roller. Roller (10) moves faster than roller (9), to carry out a first stretching step, roller (11) moves faster than roller (10) to carry out a second stretching step and roller (12) moves faster than roller (11) to carry out a third stretching step. Each of the rollers (7) to (12) are maintained at a constant temperature by means of circulating water. This temperature may be equal to, slightly lower than, or somewhat higher than normal room temperature. If stretching, e.g., at 30° C. or 40° C. is chosen the film must be preheated, and this is most simply achieved by keeping the environment at such elevated temperatures.

From the described stretching line the film proceeds to an annealing station, where it is heated, e.g. to 60-80° C., and is allowed to relax. This is conventional apparatus and in the drawing is symbolized by a box (114). It should be noted, however, that the film, while being allowed to relax, will grow wider and thereby will tend to re-shape a partly pleated form, unless this is avoided, e.g., by use of several banana rollers.

The tension in a film during the relaxation is set by the velocity of rollers (115) and (116), the latter with the rubber-coated counter roller (117), and this tension is automatically controlled by a tension measuring banana roller (118). Finally the film is reeled up on winder (119).

The primitive grooved idle rollers shown in FIG. 3 can as mentioned either be straight or curved. Thus, e.g., the two axes (20) can be understood as folded-out from planes which are perpendicular to the paper plane. The shape of the pleating is adjusted and made even by means of the rings (22), which are idling on the fixed shafts (23). The rings (24) keep rings (22) accurately spaced apart from each other. The rings (22) and (24) are made from a self-lubricating material, e.g., Teflon.

Figure 5:
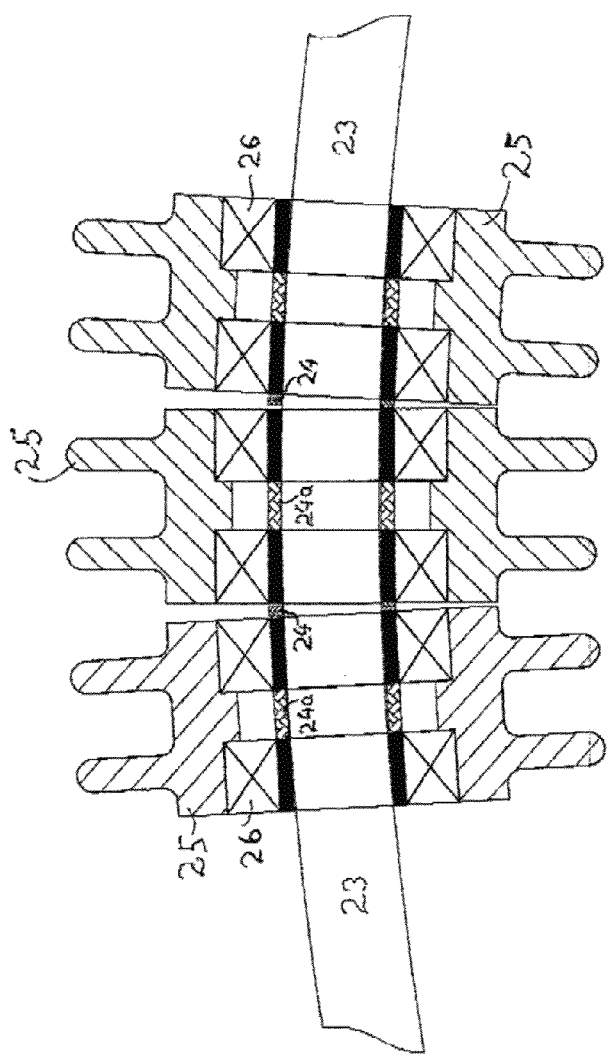
FIG. 5 shows in detail a preferred technical construction of a grooved banana roller in principle like FIG. 3, but in a more solid and durable construction.

During start-up of the pleating/stretching machine line, each pair of grooved rollers should be out of engagement with each other. The intermeshing is gradually established, e.g., by pneumatic means, while the line runs with film as this is explained in the general description. A more stable construction of a grooved banana roller is shown in FIG. 5, and a straight grooved roller for pleating can of course be made rotating all over, with bearings at the ends.

In the calculations below relating to FIG. 4a, there is made the approximation that the axes of the two smooth banana rollers, in this drawing (AB) and (CD) and in FIG. 2a (14) and (15), respectively, is equal to the radii of their convex and concave shapes. This approximation is permissible since the radii of their cross sections normally will be less than 3 cm.

(A), (E), (G), (I) and (C) represent one edge of the film at different steps of the process, and (B), (F), (H), (J) and (D) represent the other edge. The distance from (A) to (B), measured along the arc, is the width of the film as it enters the "width reduction zone", and the distance from (C) to (D), also measured along the arc, is the width of the pleated film as it exits from this zone, (P) is the center of the concentrical axes of the 5 arcs.

The degree of pleating is the ratio between the width of the unpleated, unstretched film and the pleated film as this enters roller (7) (see FIG. 2a). Width of pleated film is here measured straightly from edge to edge. This ratio essentially equals the ratio between arc-length (AB) divided by arc-length (CD) which in turn essentially equals radius (PA) divided by radius (PC).

When a film strip of a few cm width is longitudinally stretched in ratio n:1 at relatively low temperatures, it will normally tend to reduce its width and thickness almost equally, i.e., both in a ratio about √n:1, however somewhat dependent on its melt orientation. Thus, e.g., at stretch ratio 4:1 it normally reduces both width and thickness in ratio about 2:1. for stretching wide film in ratio 4:1, which was found to be about the most which HDPE or PP film can be stretched without risk of break, when the stretching temperature is about 20° C., the degree of pleating should therefore theoretically be about 2:1. The stretch ratio 4:1 here refers to the state in which no relaxation has taken place and the film still is under the highest tension occurring during the stretching. However in practice it is very difficult to form a perfectly even pleating, and in order to secure that no traces of pleats remain after the stretching, a degree of pleating between 1.5:1 and 1.6:1 was found most adequate with the mentioned stretching ratio 4:1, and temperature about 20° C.

In the drawing the radius (PA) is 1.5 times radius (PC) corresponding to degree of pleating 1.5:1. It is further shown, that the length of the "reduction zone" equals the width (arc CD) of the fully pleated film, which has been found quite adequate. The angle between the two film edges (AC) and (BD) therefore is 0.5 radian=28.6°.

In the following it is further stipulated that the length of arc (CD) and of the reduction zone is 1.00 m, the length of bow (AB) therefore 1.5 m. Radius (PA) then will be 3.00 m and radius (PC) 2.00 m. Arc (EF) can suitably be located mid between arc (AB) and bow (CD), and arc (GH) can suitably be located mid between (EF) and (CD). This means that the radius of arc (EF) is 2.50 m and the radius of arc (GH) is 2.25 m. As mentioned in connection with FIG. 2a, arc (IJ) should be very close to arc (CD). It is stipulated that its radius shall be 2.08 m.

The distance between the middle of arc (AB) and chord (AB) is 3 m×(1−cos 0.25)=9.4 cm. As it has been mentioned in the description of FIG. 1, the required fineness of the pleating depends on the transverse contraction forces and the friction between the film and the withholding stretching roller or rollers. It was found that a pitch of 15 mm on roller (7) normally is suitable for HDPE or PP based tubular film, if its gauge does not essentially exceed 0.10 mm. With reference to the description of FIG. 2a, the number of pleats passing the smooth banana roller (15) corresponds to this pitch. Consequently, taking the different radii into account, the pitch on roller pair (18) is 15×2.08÷2.00=15.6 mm. Roller pair (17) is constructed to produce half the amount of pleats, and its pitch will be: 30×2.25÷2.00=33.75 mm. Finally, roller pair (16) is constructed to produce a number of pleats which is half of this, and its pitch will be: 60×2.5÷2=75 mm. If the pleating is prepared by slightly and smoothly protruding circular segment parts on grooved roller (14), the pitch of these protrusions will be: 60×3/2=90 mm.

Figure 4B:
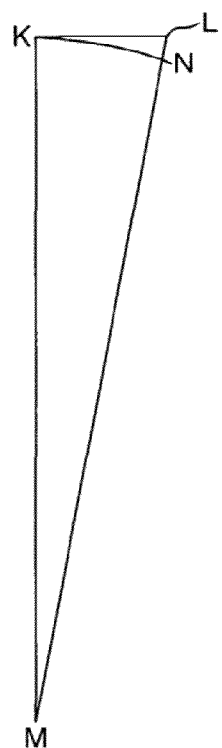
FIGS. 4a and b are geometrical drawings serving as basis for calculations of parameters for the pleating process.

The geometrical drawing FIG. 4b is drawn in a plane perpendicular to the plane of FIG. 4a and going through the points which in FIG. 4a are called (K) and (L). (M) is the point where the film leaves roller pair (6)—see FIG. 2b. (N) on line (ML) is drawn such that (MK)=(MN).

(MK) is the route which the middle of the film passes from roller pair (6) to banana roller (14), and (ML) is the route which the film edges pass between the same rollers. Thus (LM) is the difference between these two routes, and this difference creates differences in tensions. It is stipulated that a 1% difference is permissible, and the purpose of the following calculations is to establish the minimum length of the distance (KM).

The angle (LKN) is a periphery angle, thus half as big as angle (KMN), and since both are small angles, the following equation applies:

$$\frac{(LN)}{(KL)} = \frac{(KL)}{2(KM)}$$

transformed to:

$(KM) \times (LN) = \frac{1}{2} \times (KL)^2$

Another equation, expressing the max. 1% difference in distances is:

$(LN) = \frac{1}{100} \times (KM)$.

The two equations combined give:

$(KM)^2 = 50(KL)^2$, $(KM) = 7.07 \times (KL)$

As calculated in connection with FIG. 4a, (KL)=9.4 cm, and therefore $(KM) = 7.07 \times 9.4 = 66$ cm.

A similar calculation can be made re the differences in wavelengths from roller (15) to roller (7).

In FIG. 5, the rotatable corrugated parts of the grooved banana roller consist of many rings (25) which through ball bearings (26) are fixed to the circularly bent shaft (23). Shim-rings (24) and (24a) secure the proper performance of the ball rings.

Figure 6:
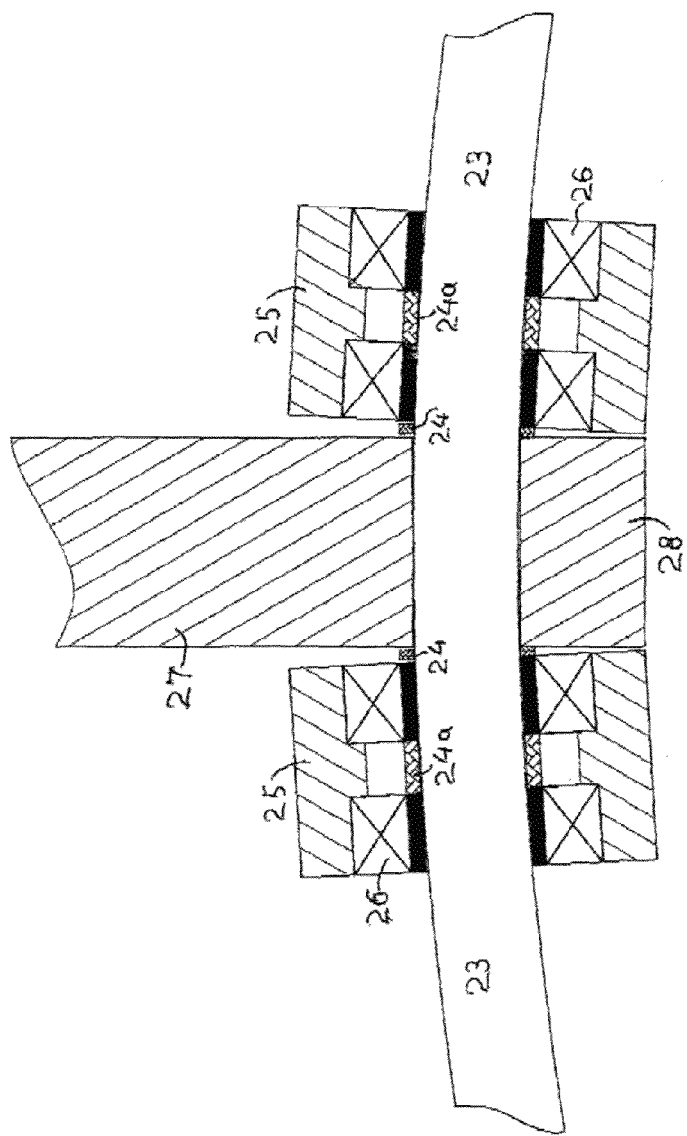
FIG. 6 shows in detail a construction of the middle of a banana roller at the inlet to or exit from the width reduction zone.

The construction of a smooth banana roller, as shown in FIG. 6, is similar to that shown in FIG. 5, except that the rings (25) do not have corrugated shape, and that arm (27) connected to the framework of the machine, support bent shaft (23) at its middle. Without such support, the tension in the film may distort the plane determined by the curved axis of the shaft. In order to simplify the drawing, the support arm (27) is shown parallel with this plane, i.e., the plane of the paper, but more practically it should be arranged obliquely with respect to this plane to best possible counteract the film tension.

Corresponding to the support arm (27) there is a "half-ring" (28) which either is an extension of this arm, or is fixed to shaft (23). The film slides over this half-ring, and the frictional heat is removed by means of cooling water pumped through a channel in the arm (not shown).

Figure 7:
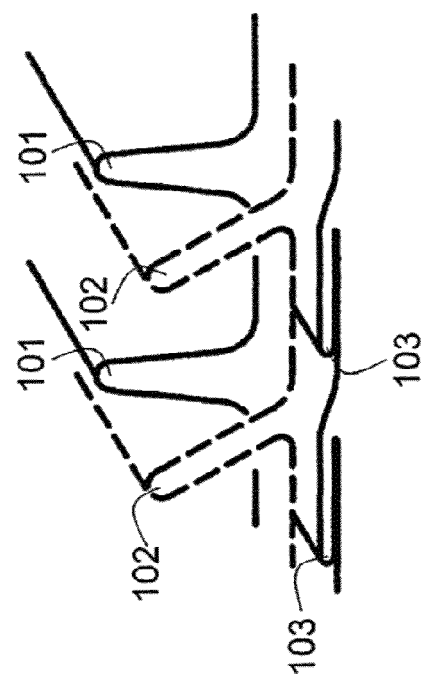
FIG. 7 shows, in schematic perspective view, several positions of a pleated film, as the pleats are laid flat on a smooth roller. For the sake of clarity the guiding tracks and the smooth roller are not shown.

In FIG. 7, the stand up convolutions (101) are gradually transformed to layflat pleats (103) all laying to the same side. One position therebetween (102) is shown. The pleats are laid flat like this all to the same side, on the smooth banana roller (15) and the smooth straight roller (7), see FIG. 2. The device to perform this operation may be a comb-like array of gradually twisting thin metal plates. This means that at their upstream end they are generally perpendicular to the axes of the smooth roller and, towards their downstream end, changing their angle to be parallel to this axis. Without any guiding device immediately upstream of each of these two smooth rollers, these rollers will tend to randomize the pleating. To some extent this randomization can also be counteracted by a simple comb or an array of freely rotating discs, but such a simple arrangement will not turn the pleats over to the same side.

Figure 8:
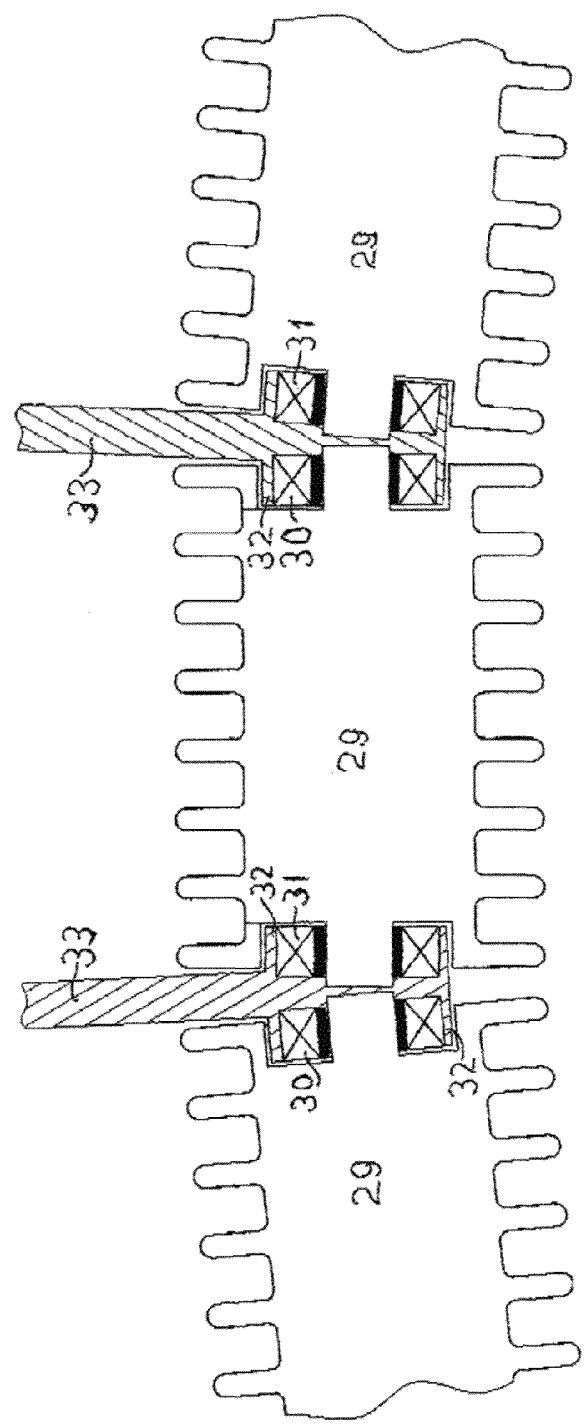
FIG. 8 shows an alternative to the banana roller of FIG. 6, namely an array of short smooth rollers forming part of a polygon, which approach an arc of a circle.

In FIG. 8, the grooved banana roller is substituted by many short, straight grooved rollers (29), each supported at its ends by a ball bearing (30) and (31). Each pair of adjacent ball bearings is encased in a housing (32), the housing being fixed through an arm (33) to the framework of the machine or to means for opening and closing the intermeshing between the rollers.

Figure 9:
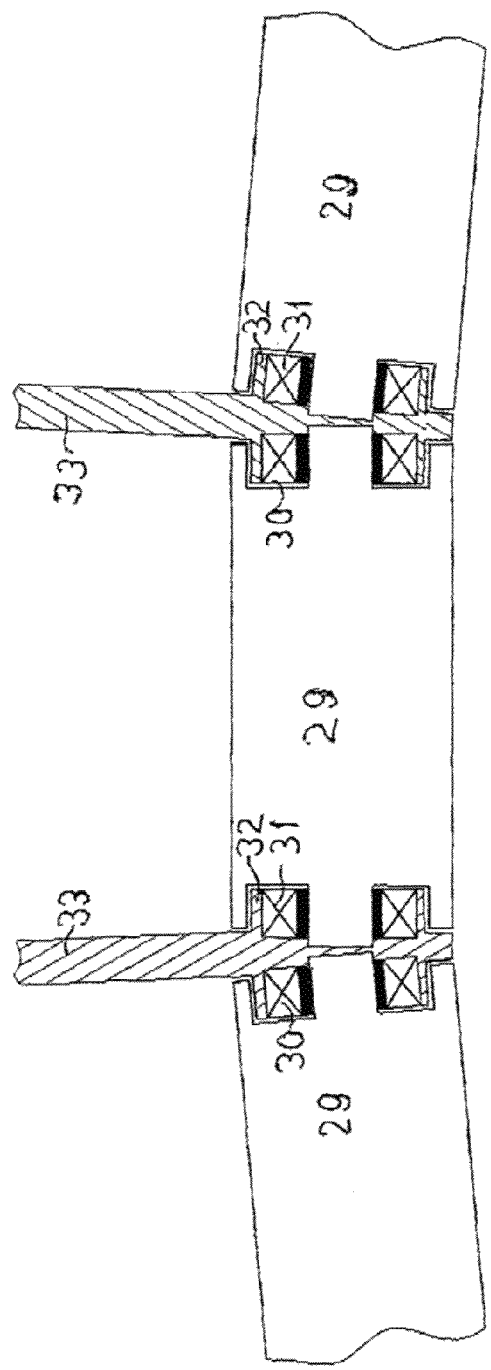
FIG. 9 shows a similar alternative to the grooved banana roller of FIGS. 3 and 5, namely an array of short grooved rollers forming part of a polygon, which approaches an arc of a circle.

FIG. 9 is identical with FIG. 8 except that, like in FIG. 7, there are nonrotatable water-cooled "half-rings" (34) over which the film slides.

In FIG. 10, (35) is the fixed shaft on which the short segments (36) can idle, connected to the shaft through ball bearings (37). As mentioned, this can be a suitable alternative to the first banana roller (14). The advantage of building up a crown-shaped roller of many short, independently moving segments is that each segment can follow the velocity of the film, almost without any sliding over the roller surface.

Example

A tubular film of 100 micron thickness is extruded from the following composition: Middle layer, 70% of total: 100% HMWHDPE.

Internal surface layer, 10% of total: LLDPE of m.f.i.=1.

External surface layer, 20% of total: 60% metallocene PE+40% LLDPE; m.f.i.=1.

Width of the lay-flat film: 54 cm. The lay-flat film is pleated and stretched at 15° C. in the apparatus shown in FIGS. 2*a* and *b*, with the modifications appearing from the following:

The radius of banana roller (15) is 1.00 m and the radius of banana roller (14) is 1.50 m, still giving the degree of pleating 1.5:1. The stretching takes place in two steps only. The grooved roller pair (16) is omitted. The rollers of pair (18) have radius 1.06 m and those of pair (17) 1.15 m. The pitch of the driven grooved rollers (7) is 15 mm, and from this the pitch of the other grooved rollers is calculated similarly to the calculations in connection with FIG. 4*a*.

The temperature of the stretching rollers are maintained at 15° C. by means of circulating water. In the oven (114) the film is treated at 70° C. under a low tension, controlled by roller (118) with connected devices.

The stretching ratio measured as the ratio between the velocity of the last and the first set of stretching rollers is 2.8:1, and the final stretching ratio after the relaxation is 2.8:1.

The lay-flat tubular film then is helically cut to produce a single film in which the main direction of orientation forms an angle of 45° to the machine direction, and is continuously laminated to a similar film between nip rollers at 70°, whereby the metallocene containing layers are acting as lamination layers.

I claim:

1. A process of supplying a thermoplastic polymer film with longitudinal orientation comprising the steps of:
    reducing a width of a film in a reduction zone comprising at least one pair of curved mutually intermeshing grooved rollers or curved intermeshing sets of discs to form a regular pattern of longitudinally extending pleats, where the width reduction occurs gradually within the reduction zone, where a length of the reduction zone is no shorter than half of an original width of the film, and where the reduction zone length is limited by an upstream roller or roller assembly and a downstream roller or roller assembly installed having varying directions of their respective axis of rotation from a central direction at the middle of the film forming an angle of 90° with a machine direction and gradually changing towards edges of the film to forward the film in a converging manner within the reduction zone, and
    solid state stretching in one or more short zones between and/or on two or more stretching rollers or bars, where the stretching zones are adapted to fully straighten out the pleats by the inherent tendency in the polymer material making up the film to contract transversely, while being stretched longitudinally.

2. The process according to claim 1, wherein the film mainly comprises HDPE, PP or blends of these polymers.

3. The process according to claim 1, wherein the reduction zone is no longer than 3 times the original film width.

4. The process according to claim 1, wherein the film is in the form of a lay-flat tube.

5. The process according to claim 1, wherein the stretching takes place at a temperature no higher than 60° C.

6. The process according to claim 1, wherein the downstream roller or roller assembly comprises at least one banana roller with its convex side pointing towards the upstream roller or roller assembly.

7. The process according to claim 1, wherein the downstream roller assembly comprises many short rollers mounted individually and together forming part of the circumference of a polygon for the desired pattern of pleating.

8. The process according to claim 1, wherein the film while leaving the last roller or roller assembly of the downstream part of the reduction zone is guided in a direction deviating no more than 10° from being perpendicular to its movement within the reduction zone.

9. The process according to claim 1, wherein the upstream roller or roller assembly comprises a banana roller or several parallel banana rollers with the concave side pointing towards the downstream roller or roller assembly.

10. The process according to claim 9, wherein the banana roller or rollers form arcs the tangents of which at any location are perpendicular to the film tension created by the downstream roller or roller assembly.

11. The process according to claim 1, wherein the film is forwarded towards the first upstream roller in a direction deviating no more than 10° from being perpendicular to its movement within the width-reduction zone.

12. The process according to claim 1, wherein the upstream roller or roller assembly is a crown-shaped roller or an assembly of short rollers which together form a crown-shape on a straight shaft, the short rollers being connected with a common shaft through bearings to be able to rotate independently of each other.

13. The process according to claim 1, wherein the gradual reduction of the width within the reduction zone is assisted by mutually intermeshing discs, in the form of pairs of grooved banana rollers installed between the upstream roller or roller assembly and the downstream roller or roller assembly.

14. The process according to claim 13, wherein the banana roller comprises discs of different external diameters in alternating succession or of short roller segments supplied with grooves, the discs or roller segments being mounted on a bent shaft.

15. The process according to claim 13, wherein some or all of the intermeshing discs are individually adjustable in their intermeshing.

16. The process according to claim 13, wherein the gradual reduction of width is assisted by at least one pair of mutually intermeshing grooved banana rollers, wherein the intermeshing is variable by means of an adjustable force acting to move the two rollers together.

17. The process according to claim 1, wherein the gradual reduction of width within the reduction zone is assisted by a set of narrow conveyor belts following and guiding the film through at least a part of this zone, the two sets of narrow belts gradually intermeshing more and more with each other during the conveying advancement in the zone.

18. The process according to claim 1, wherein the pleating is carried out in several steps with several sets of grooved rollers, the pitch of the grooves in the sets being mutually different to develop from a coarser to a finer pleating.

19. The process according to claim 1, wherein when the film, is in a pleated state before being permanently elongated, passes over a smooth banana roller or a smooth straight roller, there are guiding means acting immediately upstream of and in close proximity to this roller, to counter act the roller's random rising of the pleating.

20. The process according to claim 19, wherein these means are screwed tracks adapted to fold all pleats over to the same side.

21. The process according to claim 1, wherein the reduction zone is no longer than 2 times the original film width.

22. The process according to claim 1, wherein the reduction zone is no more than equal to the original film width.

23. The process according to claim 1, wherein the reduction zone comprises at least two pair of curved mutually intermeshing grooved rollers or curved intermeshing sets of discs.

24. The process according to claim 23, wherein the second pair of rollers or discs are located half way between the first pair of rollers or discs and the downstream roller or roller assembly.

25. The process according to claim 1, wherein the reduction zone comprises at least three pair of curved mutually intermeshing grooved rollers or curved intermeshing sets of discs.

26. The process according to claim 25, wherein the second pair of rollers or discs are located half way between the first pair of rollers or discs and the downstream roller or roller assembly.

27. The process according to claim 26, wherein the third pair of rollers or discs are located half way between the second pair of rollers or discs and the downstream roller or roller assembly.

* * * * *